W. YOUNG.
Transplanter.
No. 85,195. Patented Dec. 22, 1868.
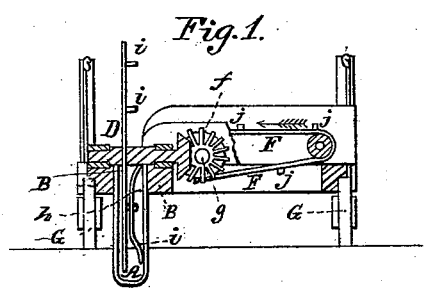
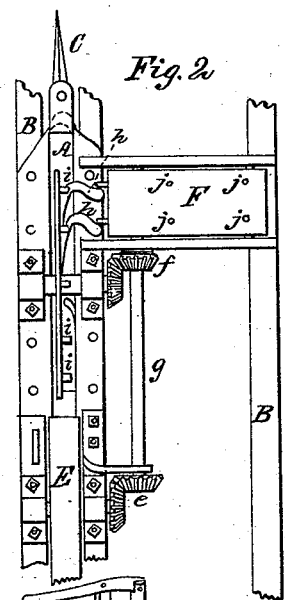
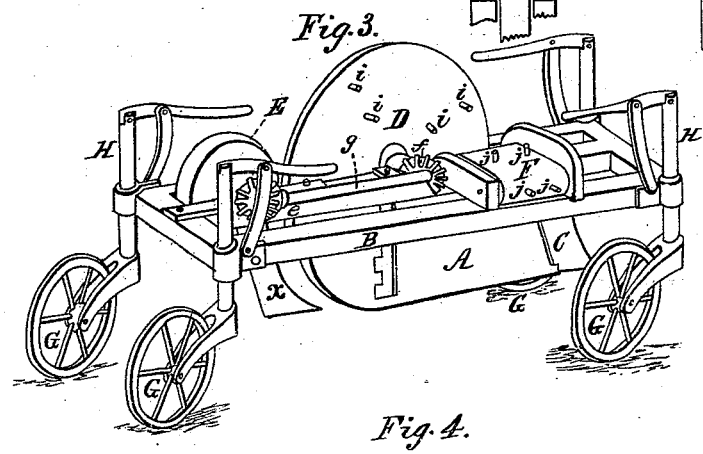
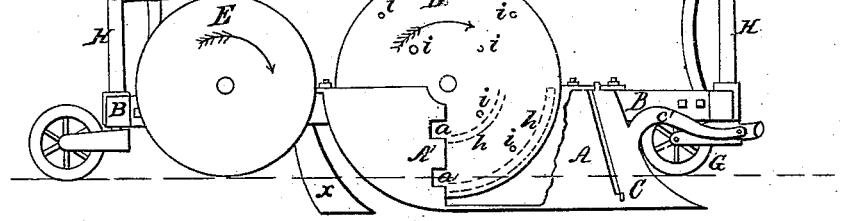
Witnesses:
N. L. Kroeber
H. Consbruch
Inventor:
Wesley Young
by J. B. Turchin his Attorney

WESLEY YOUNG, OF BLOOMINGTON, ILLINOIS.

Letters Patent No. 85,195, dated December 22, 1868.

IMPROVEMENT IN HEDGE-PLANTER.

The Schedule referred to in these Letters Patent and making part of the same.

*To all whom it may concern:*

Be it known that I, WESLEY YOUNG, of Bloomington, in the county of McLean, and State of Illinois, have invented certain new and useful Improvements in "Hedge-Planters;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is the end-view,
Figure 2 is the plan,
Figure 3 is a perspective view, and
Figure 4, a side elevation of the machine.

The nature of my invention consists in the combination of a cutting-shoe, opening a furrow; an endless belt, carrying the hedge-plants into the shoe, and depositing the same on the pins of the setting-wheel; and the setting-wheel, setting the said plants in the furrow; said parts so combined and operating as to permit to do the planting of any hedge-plants automatically.

The machine consists of a metallic shoe, A, secured to and placed between the longitudinal pieces B' B' of the frame B.

The shoe is pointed at the front, and widens to the rear, so as to gradually open a furrow, and a coulter, C, is hinged to it in the front, its point being allowed to have some lateral motion, for the purpose of easily changing the direction of the shoe.

The coulter C may also be provided with an arm, $c'$, to the end of which a whiffle-tree could be attached.

The shoe A consists of two vertical plates, and a bottom, and encases the lower half of the setting-wheel D.

The inside vertical plate of the shoe is radially cut open or split at A', opposite the centre of the wheel D, and the rear edge of the cut is bent inside, for the purpose of forming a passage for the hedge-plants, when they are brought to a vertical position by the wheel D, to be deposited in the furrow, and is provided with notches $a\ a$, to let the pins $i\ i$, of the setting-wheel D, pass through this bent edge A'.

F is an endless belt, on which the plants are placed, and by which they are carried to the setting-wheel.

The belt is provided with pins, $j\ j$, to easily carry the plants.

Setting-wheel D is journalled to the pieces B' B', of the frame, and is provided with pins, $i\ i$, placed radially on its inside surface, for the purpose of catching the plants, brought to the wheel by the endless belt F, conveying them down, and placing them vertically into the furrow, through the cut A' of the shoe.

In order to prevent the plants from dropping down, when they are being carried down by the pins $i\ i$ of the setting-wheel, springs, $h\ h$, are secured on and to the inside surface of the vertical plate of the shoe A, which press the plants to the carrying-surface of the setting-wheel, and thus facilitate their setting in a vertical position.

There is a rear coulter, $k$, of triangular shape, and secured to the frame, in such a manner as to have its point in the line with the outside plate of the shoe A, and behind the same, for the purpose of turning off the earth towards the plants set in the furrow, and pressing that earth against said plants, so as to keep them in vertical position.

The endless belt and the setting-wheel are worked by a heavy cast-iron roller or wheel, E, having its axle journalled to the frame B, and rolling over the ground behind the shoe, as it is cutting the furrow.

The bearings for the roller's axle may be made adjustable, so as to allow the roller to be raised or lowered.

The axle of the roller, at one end, is provided with a bevel-pinion, gearing into pinion $e$ of the shaft $g$, operating the endless belt F, and the shaft $g$ is provided with a bevel-pinion, $f$, gearing into the pinion set on the axle of the setting-wheel D.

The frame B, at the corners, is provided with movable legs, H H, provided with rollers, G G, which legs are raised above the ground, when the machine is working, and are lowered to the ground, raising the frame and all when the machine is in transportation to the place of work.

The operation consists in this, that, after the shoe A is set to a proper depth into the ground, and the roller E is brought to the ground, the horses are started, and the hedge-plants are successively deposited on the endless belt F, with their roots turned to the front, which plants, one by one, as the machine moves, are successively brought to the setting-wheel D, caught by its pins $i\ i$, carried down around and through the cut A' of the shoe, and set in a vertical position, with their roots down, in the furrow, while the rear coulter $k$ cuts the earth and presses it towards the plants, and the roller E rolls it over.

Roller E may be arranged simply for covering the furrow, while another roller, to drive the machinery, may be placed in the front part of the frame.

What I claim as new, and my invention, and desire to secure by Letters Patent, is—

1. The shoe A, constructed as described, and provided with hinged coulter C, notched cut A', and springs $h\ h$, substantially as and for the purpose set forth.

2. The setting-wheel D, partially encased by the said shoe A, and provided with radially-arranged pins $i\ i$, substantially as above described, and for the purpose specified.

3. In combination with the above, the endless belt F, rear coulter $k$, and roller E, the whole arranged and operating substantially as herein set forth and specified.

WESLEY YOUNG.

Witnesses:
S. W. DODD,
A. W. LOCK.